United States Patent
Takemoto (10) Patent No.: US 6,975,437 B2
(45) Date of Patent: Dec. 13, 2005

(54) METHOD, APPARATUS AND RECORDING MEDIUM FOR COLOR CORRECTION

(75) Inventor: Fumito Takemoto, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 846 days.

(21) Appl. No.: 09/842,766

(22) Filed: Apr. 27, 2001

(65) Prior Publication Data

US 2001/0035989 A1 Nov. 1, 2001

(30) Foreign Application Priority Data

Apr. 28, 2000 (JP) .............................. 2000-130734
Mar. 28, 2001 (JP) .............................. 2001-091708

(51) Int. Cl.[7] .............................................. G03F 3/08
(52) U.S. Cl. ...................... 358/518; 358/518; 358/1.9; 358/505; 358/537; 358/538; 348/279
(58) Field of Search .......................... 358/1.9, 505, 518, 358/537, 538; 348/279

(56) References Cited

U.S. PATENT DOCUMENTS 5,311,293 A * 5/1994 MacFarlane et al. ........ 356/421
6,101,272 A * 8/2000 Noguchi ..................... 382/167
6,154,217 A * 11/2000 Aldrich ....................... 345/589
6,278,533 B1 * 8/2001 Takemoto ................... 358/521
6,791,716 B1 * 9/2004 Buhr et al. .................. 358/1.9
2001/0035988 A1 * 11/2001 Semba et al. ............... 358/518

FOREIGN PATENT DOCUMENTS

JP 11-234523 8/1999

* cited by examiner

Primary Examiner—Kimberly Williams
Assistant Examiner—Michael Burleson
(74) Attorney, Agent, or Firm—Birch, Stewart, Kolasch & Birch, LLP (57) ABSTRACT

Appropriate color correction is carried out when image data obtained by a digital camera are printed. Correction degrees for lightness, chroma, and hue are set for specific colors R, G, B, C, M, Y, YG, BS, SK(HL), SK(MD), SK(SD) in an image represented by the image data. In an L*a*b* color space, a distance between a center color of each of the specific colors and a color comprising the image represented by the image data is found. Based on the distance, the correction degrees for lightness, chroma and hue of the specific colors are subjected to weighted addition, and correction values for lightness, chroma and hue are obtained. Based on the correction values, lightness, chroma and hue of the image represented by the image data are corrected, and processed image data are obtained.

12 Claims, 10 Drawing Sheets

REFERENCE COLOR CORRECTION MENU

| | L | C | H |
|---|---|---|---|
| R | 0 | -5 | -3 |
| G | 0 | 0 | 0 |
| B | 0 | 0 | 0 |
| C | 0 | 0 | 0 |
| M | 0 | 0 | 0 |
| Y | 0 | 0 | 0 |
| YG | 0 | 0 | 0 |
| BS | 0 | 0 | 0 |
| SK(HL) | 0 | 0 | 0 |
| SK(MD) | 0 | 0 | 0 |
| SK(SD) | 0 | 0 | 0 |

MODEL COLOR CORRECTION MENU

| | L | C | H |
|---|---|---|---|
| R | 0 | -2 | -5 |
| G | 0 | 0 | 0 |
| B | 0 | -3 | 0 |
| C | 0 | 0 | 0 |
| M | 0 | 0 | 0 |
| Y | 0 | 3 | 0 |
| YG | 0 | 0 | 0 |
| BS | 0 | 0 | 10 |
| SK(HL) | 0 | 0 | 0 |
| SK(MD) | 0 | 0 | 0 |
| SK(SD) | 0 | 0 | 0 |

| POINT A | 0 | 5 | 0 |
|---------|---|---|---|
| POINT B | 0 | -5 | 0 |

FIG.10

METHOD, APPARATUS AND RECORDING MEDIUM FOR COLOR CORRECTION

BACKGROUND OF THE INVENTION

1. Field of the Invention

The present invention relates to a method and an apparatus for carrying out color correction processing on digital image data obtained by a digital camera. The present invention also relates to a computer-readable recording medium storing a program to cause a computer to execute the color correction method.

2. Description of the Related Art

In a digital still camera (hereinafter called digital camera), an image obtained by photographing is recorded as digital image data in an internal memory installed in the camera or in a recording medium such as an IC card, and the image can be displayed by using a monitor or a printer based on the recorded digital image data. When an image obtained by a digital camera is printed, the image is expected to have as high a quality as a photograph generated from a negative film.

Meanwhile, in the field of printing, a system for outputting an image as a hard copy from a printer by reading a color image with a scanner to obtain input image data and by carrying out a desired kind of image processing on the input image data to generate output image data has been put into practice (Japanese Unexamined Patent Publication No. 11(1999)-234523, for example) In such a system, the input image data are converted from RGB color signals into CMYK dot % signals. First, a tone curve (a tone conversion table) and a color correction amount used in a color correction unit are set for the input image data, and a three-dimensional look-up table (hereinafter called 3DLUT) for converting the input image data into the output image data is generated based on the tone curve and the color correction amount that have been set. The RGB color signals of the input image data are converted into the CMYK dot % signals of the output image data by interpolating the 3DLUT. Printing is carried out by controlling an amount of ink of each color by the dot % signal.

In such a system, the color correction amount is set so that lightness, chroma and hue of specific colors (such as C, M, Y, and K) in an image become appropriate. By setting the color correction amount, the specific colors in the image after the color correction have appropriate lightness, chroma and hue.

Meanwhile, color correction is also carried out when image data obtained by a digital camera are printed. Appropriate correction of the lightness, the chroma and the hue of the specific colors is also expected from this color correction, as from the color correction by the system for printing.

SUMMARY OF THE INVENTION

The present invention has been conceived based on consideration of the problem described above. An object of the present invention is therefore to provide a method and an apparatus for carrying out appropriate color correction when image data obtained by a digital camera are printed, and to provide a computer-readable recording medium storing a program to cause a computer to execute the color correction method.

A color correction method of the present invention is a method for obtaining processed image data by carrying out color correction processing on image data obtained by a digital camera, and the method comprises the steps of:

setting correction degrees for lightness, chroma and hue of predetermined specific colors;

obtaining correction values for lightness, chroma and hue by weighted addition of the correction degrees of the lightness, the chroma and the hue of the specific colors, based on a distance in a uniform color difference space between a center color of each of the specific colors and a color comprising an image represented by the image data; and obtaining the processed image data by correcting lightness, chroma and hue of the image represented by the image data, based on the correction values of the lightness, the chroma and the hue.

The "uniform color difference space" is a color space in which chroma and hue can be easily controlled, such as an L*a*b* color space and an L*u*v* color space. In the uniform color difference space, equal distances therein are perceived as equal differences.

The color correction in the present invention refers to not only color correction carried out directly on the image data but also conversion of the image data based on a three-dimensional look-up table representing a relationship between the image data and the processed image data.

In the color correction method of the present invention, it is preferable for the specific colors to include a skin color. In this case, the skin color is preferably classified into a plurality of types according to lightness, chroma and/or hue thereof.

In the color correction method of the present invention, it is preferable for the image represented by the image data to be displayed on display means so that a desired position can be specified in the image displayed on the display means. In this manner, a color at the specified position in the image is included in the specific colors.

A color correction apparatus of the present invention is an apparatus for obtaining processed image data by carrying out color correction processing on image data obtained by a digital camera, and the color correction apparatus comprises:

correction degree setting means for setting correction degrees of lightness, chroma and hue of predetermined specific colors;

weighted addition means for obtaining correction values for lightness, chroma and hue by carrying out weighted addition of the correction degrees of the lightness, the chroma and the hue of the specific colors, based on a distance in a uniform color difference space between a center color of each of the specific colors and a color comprising an image represented by the image data; and correction means for obtaining the processed image data by correcting lightness, chroma and hue of the image represented by the image data, based on the correction values of the lightness, the chroma and the hue.

In the color correction apparatus of the present invention, it is preferable for the specific colors to include a skin color. In this case, the skin color is preferably classified into a plurality of types according to lightness, chroma and/or hue thereof, and included in the specific colors.

It is also preferable for the color correction apparatus of the present invention to further comprise:

display means for displaying the image represented by the image data; and specification means for specifying a desired position in the image displayed on the display means, so that a color at the specified position in the image is included in the specific colors.

The color correction method of the present invention may be provided as a computer-readable recording medium storing a program to cause a computer to execute the color correction method.

According to the present invention, the correction degrees are set for the lightness, the chroma and the hue of the predetermined specific colors, and the correction values for the lightness, the chroma and the hue are found by weighted addition of the correction degrees of the lightness, the chroma and the hue of the specific colors, based on the distance in the uniform color difference space between the center color of each of the specific colors and the color comprising the image represented by the image data. The lightness, the chroma and the hue of the image represented by the image data are corrected according to the correction values of the lightness, the chroma and the hue. In this manner, the lightness, the chroma and the hue of the specific colors in the image represented by the image data can be corrected appropriately, and the processed image data enabling reproduction of the image at high quality can be obtained.

If the skin color is included in the specific colors, the skin color can be corrected appropriately, and an image including a person can be high quality.

Meanwhile, a skin color in one image may have different lightness, chroma and/or hue, depending on a position and a type of a light source used at the time of photographing. In such a case, if the correction values of the lightness, the chroma and the hue are found for one skin color as a portion of the specific colors, the skin color has uniform lightness, chroma and/or hue, which causes the image to look unnatural. Therefore, the skin color is classified into a plurality of types according to the lightness, the chroma and the hue thereof, and these types are included in the specific colors. In this manner, the skin color can be corrected appropriately based on the lightness, the chroma and/or the hue thereof, and an image giving a natural impression can be obtained.

Furthermore, if the image represented by the image data is displayed on the display means and the color at the desired position in the image is included in the specific colors, the lightness, the chroma and the hue of any desired color in the image can be corrected, and an image having the appropriate color can be obtained.

DESCRIPTION OF THE PREFERRED EMBODIMENT

Hereinafter, an embodiment of the present invention will be explained with reference to the accompanying drawings.

Figure 1:
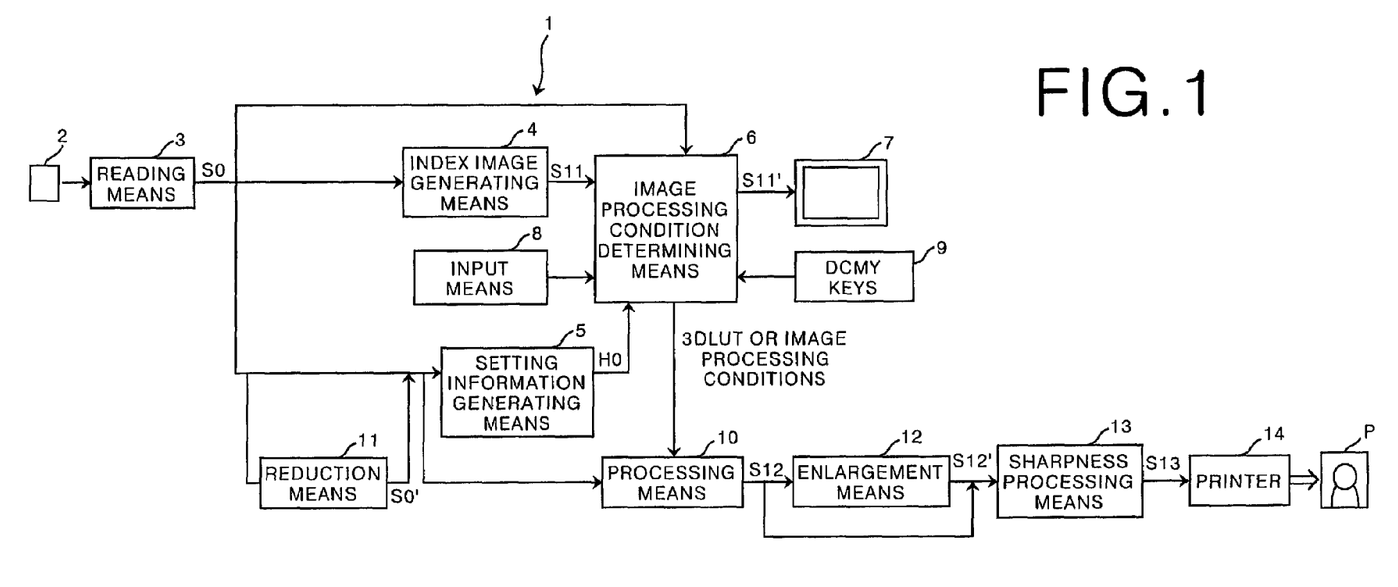
FIG. 1 is a block diagram showing a configuration of an image output apparatus comprising a color correction apparatus as an embodiment of the present invention.

FIG. 1 is a block diagram showing a configuration of an image output apparatus adopting a color correction apparatus as the embodiment of the present invention. As shown in FIG. 1, an image output apparatus 1 in this embodiment comprises reading means 3 for reading, from a memory card 2, image data S0 comprising color data R0, G0 and B0 obtained by photographing a subject with a digital camera, index image generating means 4 for generating index image data S11 representing index images by reducing the image data S0, setting information generating means 5 for generating setting information H0 necessary for setting tone conversion tables T0 which will be explained later by analyzing the image data S0, image processing condition determining means 6 for setting image processing conditions for carrying out tone conversion processing and color correction processing on the image data S0 upon printing the image data S0 and for carrying out tone conversion processing on the index image data S11, a monitor 7 for displaying index image data S11' after the tone conversion processing as index images, input means 8 for carrying out various kinds of inputs to the image processing condition determining means 6, DCMY keys 9 for changing density, processing means 10 for obtaining converted image data S12 by converting the image data S0 according to a 3DLUT or the image processing conditions generated or set by the image processing condition determining means 6, reduction means 11 for obtaining reduced image data S0' by reducing the image data S0 in the case where the number of pixels for one image in the image data S0 is larger than the number of pixels necessary for printing the image, enlargement means 12 for obtaining enlarged image data S12' by enlarging the converted image data S12 in the case where the number of the pixels in the image data S0 is smaller than the number of the pixels necessary for printing, sharpness processing means 13 for obtaining processed image data S13 by carrying out sharpness processing on the converted image data S12 or on the enlarged image data S12', and a printer 14 for obtaining a print P by outputting the processed image data S13.

In the following explanation, processing is carried out on the reduced image data S0' in the case where the image data S0 are reduced by the reduction means 11. However, for the sake of simplicity, the processing is carried out only on the image data S0 in the explanation below, and explanation regarding the processing on the reduced image data S0' is omitted.

The reading means 3 comprises a card reader and the like for reading the image data S0 from the memory card 2. Since the image data read from the memory card 2 are generally compressed, the reading means 3 comprises decompression means not shown, and the image data S0 are obtained by decompressing the image data read from the memory card 2 by using the decompression means. Information indicating a model of the digital camera that obtained the image data S0 (hereinafter called camera model information) is added to the image data S0 as tag information thereof. Therefore, the camera model information is also read. As a standard for recording the camera model information as the tag information, "Baseline TIFF Rev. 6.0 RGB Full Color Image" adopted as a non-compressed file format of an Exif file can be used, for example. In the case where the image data S0 do not have the camera model information, the camera model information can be input manually from the input means 8.

The index image generating means 4 reduces the image data S0 by thinning or the like, and generates the index image data S11.

The setting information generating means 5 generates the setting information H0 in the following manner. In general, automatic exposure control processing (AE processing) and automatic white balance processing (AWB processing is carried out in a digital camera for reproduction of image data on a monitor. However, in the case where the image data are reproduced by a printer, the AE processing and the AWB processing (hereinafter called AE/AWB processing) carried out in the digital camera is not sufficient. Therefore, AE/AWB processing appropriate for printing is necessary. The setting information generating means 5 estimates a correction amount necessary for AE/AWB processing optimal for printing for each of RGB color signals comprising the image data S0. The correction amount is included in the setting information H0. For this reason, an average of each of the RGB color signals comprising the image data S0 is found as described in Japanese Unexamined Patent Publication No. 11(1999)-220619, and a correction value is determined so that the average becomes a target value appropriate for printing. The correction value is included as the correction amount in the setting information H0 and output. The correction amount is for correcting exposure and white balance.

The setting information generating means 5 finds a correction amount used for correcting highlight and shadow of tones into a nonlinear form when the image processing condition determining means 6 determines the image processing conditions that will be explained later. This correction amount is also included in the setting information H0. A printer generally has an arrow density reproduction range, and colors easily become evenly bright in a highlight portion and evenly dark in a shadow portion of an image. Therefore, as described in Japanese Unexamined Patent Publication No. 11(1999)-331596, the setting information generating means 5 finds the correction amount to harden tones of the highlight portion and soften tones of the shadow portion, in the case where density of the print increases because of the AE processing or the AWB processing. On the contrary, in the case where the density decreases in the print, the setting information generating means 5 finds the correction amount so that the tones of the highlight portion are softened and the tones of the shadow portion are hardened. The correction amount is also included in the setting information H0.

The setting information generating means 5 reads the tag information of the image data S0, and includes the camera model information of the tag information and the number of pixels (hereinafter called Y0) of an image represented by the image data S0 in the setting information H0. In the case where flash information is included in the tag information, the flash information is also included in the setting information H0.

The monitor 7 displays the index images represented by the index image data S11'. At the time of correcting tone curves and color correction conditions that will be explained later, the tone curves and the color correction conditions are also displayed on the monitor together with the index images. In this embodiment, the number of the index images displayed simultaneously is six.

The input means 8 comprises a keyboard and a mouse for carrying out various kinds of input to the image processing condition determining means 6. A type of tones used as a reference at the time of determining the image processing conditions (hereinafter called reference tones) is input from the input means 8. The reference tones refer to tones for carrying out tone conversion processing on the image data to cause the print P to have appropriate tones when printing is carried out by the printer 14. As the reference tones, tones for a standard situation, tones for cloudy weather, tones for backlight, and tones for flash photographing are selectable. By selection of one of the types of the reference tones input from the input means 8, the image processing condition determining means 6 sets a reference tone curve representing the selected reference tones. If correction of the tone curves including the reference tone curve is needed to obtain desired tones, the tone curves are shown on the monitor 7 and corrected by an input from the input means 8.

The DCMY keys 9 comprise four keys for correcting density D of an entire image and for correcting densities of cyan (C) magenta (M) and yellow (Y), respectively. Depending on how many times each of these keys is pressed down, the density of the entire image or each of the colors can be changed by the image processing condition determining means 6. Correction of the reference tone curve representing the reference tones input from the input means 8 and the change of the densities input from the DCMY keys 9 are reflected in the index images displayed on the monitor 7 in real time.

The image processing condition determining means 6 sets the image processing conditions for carrying out the tone conversion processing and the color correction processing on the image data S0. Depending on the number Y0 of pixels in the image represented by the image data S0 included in the tag information of the image data S0, the image processing condition determining means 6 outputs to the processing means 10 either the image processing conditions as they are, or the 3DLUT generated therein based on the image processing conditions. In the image output apparatus in this embodiment, the image processing condition determining means 6 compares the number Y0 with the number of lattice points in the 3DLUT, in order to shorten processing time. In the case where the number Y0 of the pixels is larger than the number of the lattice points, the 3DLUT is generated and output to the processing means 10. On the other hand, if the number Y0 of the pixels is equal to or smaller than the number of the lattice points, the image processing conditions are output to the processing means 10 as they are, and the 3DLUT is not generated. Hereinafter, the image processing condition determining means 6 will be explained in detail, with reference to FIG. 2.

Figure 2:
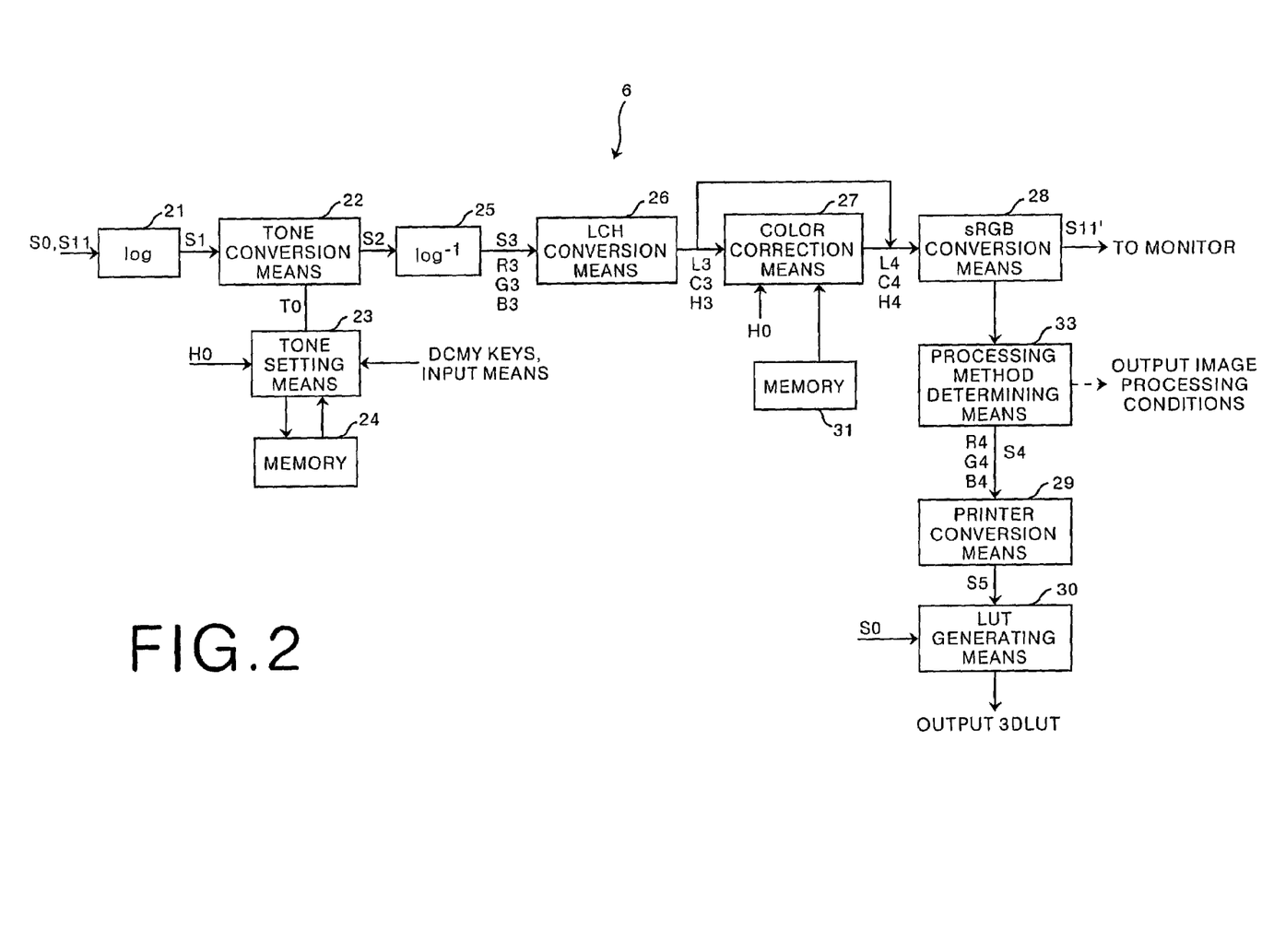
FIG. 2 is a block diagram showing a configuration of image processing condition determining means.

FIG. 2 is a block diagram showing a configuration of the image processing condition determining means 6. In the case where the image data S0 comprise 8-bit RGB color data upon generating the 3DLUT, $256^3$ data will be necessary for the 3DLUT if all the data are converted. Consequently, generation of the 3DLUT becomes time-consuming. Therefore, in this embodiment, the 3DLUT is generated by reducing the number of bits of each of the color data R0, G0, and B0 so that the number of the lattice points becomes ($2^n/8+1$) where n is the number of bits of the image data S0. For example, in the case where the image data S0 comprise the RGB color data having 8 bits each, the number of bits of each of the color data is reduced to generate the 3DLUT comprising $33^3$ lattice points having 33 data for each color, namely 0, 7, 15, . . . , 247 and 255.

As shown in FIG. 2, the image processing condition determining means 6 comprises logarithmic conversion means 21 for obtaining image data S1 by carrying out logarithmic conversion on antilogarithmic color data R0', G0', and B0' representing colorimetric values of the subject itself and found from the image data S0 (having the reduced number of bits according to ITU-R BT.709 (REC. 709) by using Equations (1)~(3) below, tone conversion means 22 for obtaining image data S2 by carrying out tone conversion processing on the image data S1 after the logarithmic conversion, tone setting means 23 for setting the tone conversion tables T0 used for the tone conversion by the tone conversion means 22, a memory 24 storing a plurality of tone curves, inverse logarithmic conversion means 25 for obtaining image data S3 comprising color data R3, G3, and B3 by carrying out inverse logarithmic conversion on the image data S2, LCH conversion means 26 for converting the color data R3, G3, and B3 comprising the image data S3 into data L3, C3 and H3 representing lightness L*, chroma C*, and hue angle HA, color correction means 27 for obtaining color corrected data L4, C4, and H4 by carrying out color correction processing on the data L3, C3, and H3, sRGB conversion means 28 for obtaining color corrected image data S4 comprising color data R4, G4, and B4 by converting the color corrected data L4, C4 and H4 into an sRGB color space which is a color space for monitor display, printer conversion means 29 for obtaining print image data S5 by converting the color corrected image data S4 into a color space for printing, LUT generating means 30 for generating the 3DLUT based on the image data S0 and the print image data S5, and processing method determining means 33 for determining whether the image processing conditions or the 3DLUT are output to the processing means 10. The color correction means 27 is connected to a memory 31 storing a plurality of color correction menus.

$$Pr = R0/255$$

$$Pg = G0/255$$

$$Pb = B0/255 \quad (1)$$

$$R0' = ((Pr + 0.099)/1.099)^{2.222} \quad (2)$$

$$G0' = ((Pg + 0.099)/1.099)^{2.222} \text{ (if } Pr, Pg, Pb \geq 0.081\text{)}$$

$$B0' = ((Pb + 0.099)/1.099)^{2.222}$$

$$R0' = Pr/4.5 \quad (3)$$

$$G0' = Pg/4.5 \text{ (if } Pr, Pg, Pb < 0.081\text{)}$$

$$B0' = Pb/4.5$$

The memory 24 stores reference tone curves comprising tone curves for the standard situation, cloudy weather, backlight, and flash photographing, as well as tone curves corresponding to models of digital camera.

Figure 3:
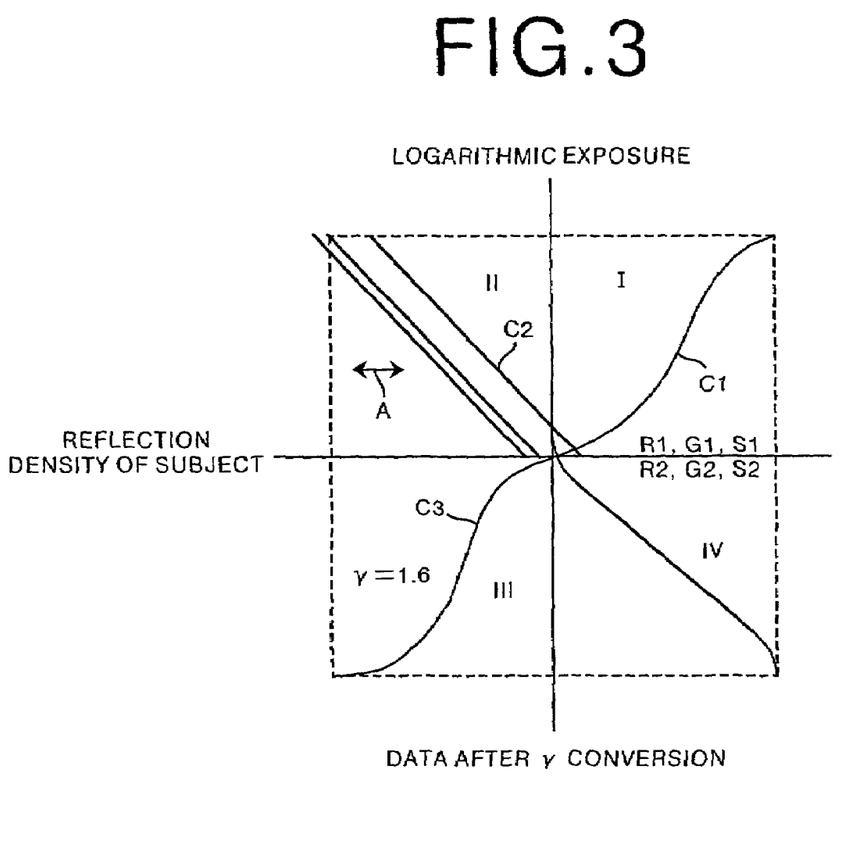
FIG. 3 is a diagram explaining setting of a tone conversion table.

The tone conversion tables T0 are set by the tone setting means 23, in order to convert tones of the image data S1 in the following manner. FIG. 3 is a diagram for explaining how the tone conversion tables T0 are set. The tone conversion tables T0 generate the color data R2, G2, and B2 comprising the image data S2 by the tone conversion of the color data R1, G1, and B1 comprising the image data S1 according to first to fourth quadrants in FIG. 3. In the tone setting means 23, the tone conversion tables T0 are set for the RGB colors. First, the setting information H0 is input to the tone setting means 23, and one of the tone curves corresponding to the model of the digital camera is read from the memory 24 based on the information on the model of the digital camera included in the setting information H0. Meanwhile, the reference tone curve for the standard situation is read from the memory 24 as a default of the reference tone curves. However, if reading the reference tone curve for cloudy weather or for backlight or for flash photographing is instructed from the input means 8, the corresponding tone curve is read from the memory 24.

A tone curve C1 corresponding to the model of the digital camera is set in the first quadrant as shown in FIG. 3. Since a quality of a reproduced image varies depending on a model or a manufacturer of a digital camera, the tone curve C1 has been generated for the model of the digital camera to absorb a tone characteristic of the camera. By using the tone curve C1, images of uniform quality can be obtained regardless of the model of the camera. By converting the color data R1, G1 and B1 based on the tone curve C1, data representing a logarithmic exposure value compensating the tone characteristic of the camera can be obtained.

A line C2 for correcting exposure is set in the second quadrant. The line C2 for exposure correction is basically a line passing through the origin. By translating the line C2 in directions shown by an arrow A based on the correction amount for white balance and exposure included in the setting information H0, the exposure is corrected. AE/AWB processing appropriate for printing is carried out based on the line C2, and data representing reflection density of the subject are obtained.

A reference tone curve C3 is set in the third quadrant. In this example, the reference tone curve C3 for the standard situation is set. The reference tone curve C3 has an "S"-like shape and a middle portion thereof corresponds to the case of γ=1.6. In this embodiment, the conversion by the reference tone curve C3 is called γ conversion. By using the tone curve C3, density data appropriate for printing can be obtained.

A tone curve C4 for correcting the tones of the highlight portion and the shadow portion of the image to become nonlinear is set in the fourth quadrant. A correction amount for the tone curve C4 is determined by the correction amount of the highlight portion and the shadow portion included in the setting information H0. By using the tone curve C4, the color data R2, G2 and B2 comprising the image data S2 can be obtained.

The tone conversion tables T0 are changed by an input from the input means 8 or from the DCMY keys 9. C, M, and Y of the index images shown on the monitor 7 can be changed by pressing down the DCMY keys 9. Changes in C, M, and Y are converted into changes of densities of R, G, and B, and the tone conversion tables T0 are changed according to the changes in the densities. In other words, the changes of RGB densities are predetermined depending on how many times the DCMY keys 9 are hit, and the densities are changed according to pressing the DCMY keys 9. More specifically, by translating the line C2 in the directions shown by the arrow A in the second quadrant based on how many times the DCMY keys are hit, the densities of R, G, and B are changed. Furthermore, the tone curve C1 in the first quadrant or γ of the tone curve C3 in the third quadrant is changed by the input from the input means 8. In this case, the tone curves C1 and C3 for each of the colors are displayed together with the index images on the monitor 7, and a user changes the tone curves C1 and C3 as desired with the input means 8 while viewing the index images. By changing the tone curve C1, the line C2 and/or the tone curve C3, the tone conversion tables T0 are changed.

The tone conversion means 22 obtains the image data S2 by converting the image data S1 based on the tone conversion tables T0 set by the tone setting means 23.

Processing in the logarithmic conversion means 21, the tone conversion means 22, and the inverse logarithmic conversion means 25 is carried out in an RGB color space.

The LCH conversion means 26 converts the image data S3 from the RGB color space into an L*a*b* color space, and obtains the data L3, C3, and H3 representing the lightness L*, the chroma C*, and the hue angle HA. Hereinafter, this conversion will be explained. Since the image data S0 obtained by the digital camera are according to ITU-R BT.709 (REC 709), the color data R3, G3, and B3 comprising the image data S3 are converted into CIE1931 tristimulus values X, Y, and Z based on the following Equation (4):

$$\begin{pmatrix} X \\ Y \\ Z \end{pmatrix} = |A| \begin{pmatrix} R3 \\ G3 \\ B3 \end{pmatrix} \quad (4)$$

Here, the matrix |A| is a matrix for converting the color data R3, G3, and B3 into the tristimulus values X, Y, and Z, and the following values can be used, for example:

$$|A| = \begin{pmatrix} 0.4124 & 0.3576 & 0.1805 \\ 0.2126 & 0.7152 & 0.0722 \\ 0.0193 & 0.1192 & 1.0571 \end{pmatrix} \quad (5)$$

Instead of the matrix |A|, a look-up table may be used to find the tristimulus values X, Y, and Z.

CIE1976 L*(=L3), C*(=C3), and HA (=H3) are found from the tristimulus values X, Y, and Z, based on Equations (6)~(8) below: {PARA0}

$$a* = 500\{f(X/Xn) - f(Y/Yn)\} \quad (6)$$

$$b* = 200\{f(Y/Yn) - f(Z/Zn)\}$$

$$L* = 116(Y/Yn)^{1/3} - 16 \text{ (if } Y/Yn > 0.008856)$$

$$L* = 903.25(Y/Yn) \text{ (if } Y/Yn \leq 0.008856)$$

If $X/Xn, Y/Yn, Z/Zn > 0.008856$, $f(a/an)=(a/an)^{1/3} (a=X, Y, Z)$

If $X/Xn, Y/Yn, Z/Zn \leq 0.008856$, $f(a/an)=7.787(a/an)+16/116$

Xn, Yn, and Zn are tristimulus values for white and can be substituted by tristimulus values corresponding to CIE-D65 (a light source whose color temperature is 6500 K).

$$c* = (a*^2 b*^2)^{1/2} \quad (7)$$

$$HA = \tan^{-1}(b*/a*) \quad (8)$$

The color correction means 27 corrects lightness, chroma and hue of eleven colors, namely R, G, B, C, M, Y, YellowGreen (YG), BlueSky (BS), a skin color SK(HL) in the highlight portion, a skin color SK(MD) having an intermediate density, and a skin color SK(SD) in the shadow portion. More specifically, the corrected data L4, C4, and H4 are obtained by correcting the data L3, C3 and H3 according to Equations (9)~(11) below:

$$L4=L3-\Delta L \quad \Delta L=\Sigma LPi\ Wi+\Sigma LPj\ Wj+\Delta l\ Wj \quad (9)$$

$$C4=C3-\Delta C \quad \Delta C=\Sigma CPi\ Wi+\Sigma CPj\ Wj+\Delta c\ Wj \quad (10)$$

$$H4=H3-\Delta H \quad \Delta H=\Sigma HPi\ Wi+\Sigma HPj\ Wj+\Delta h\ WJ \quad (11)$$

where $\Delta L$: a correction value for the lightness,
$\Delta C$: a correction value for the chroma,
$\Delta H$: a correction value for the hue,
i: R, G, B, C, M, Y, YG, BS,
j: SK(HL), SK(MD), SK(SD),
LPi, LPj: correction degrees in the lightness,
CPi, CPj: correction degrees in the chroma,
HPi, HPj: correction degrees in the hue,
Wi, Wj: intensity functions,
$\Delta l$: a lightness change caused by tone conversion,
$\Delta c$: a chroma change caused by tone conversion, and
$\Delta h$: a hue caused by tone conversion.

Figure 4:
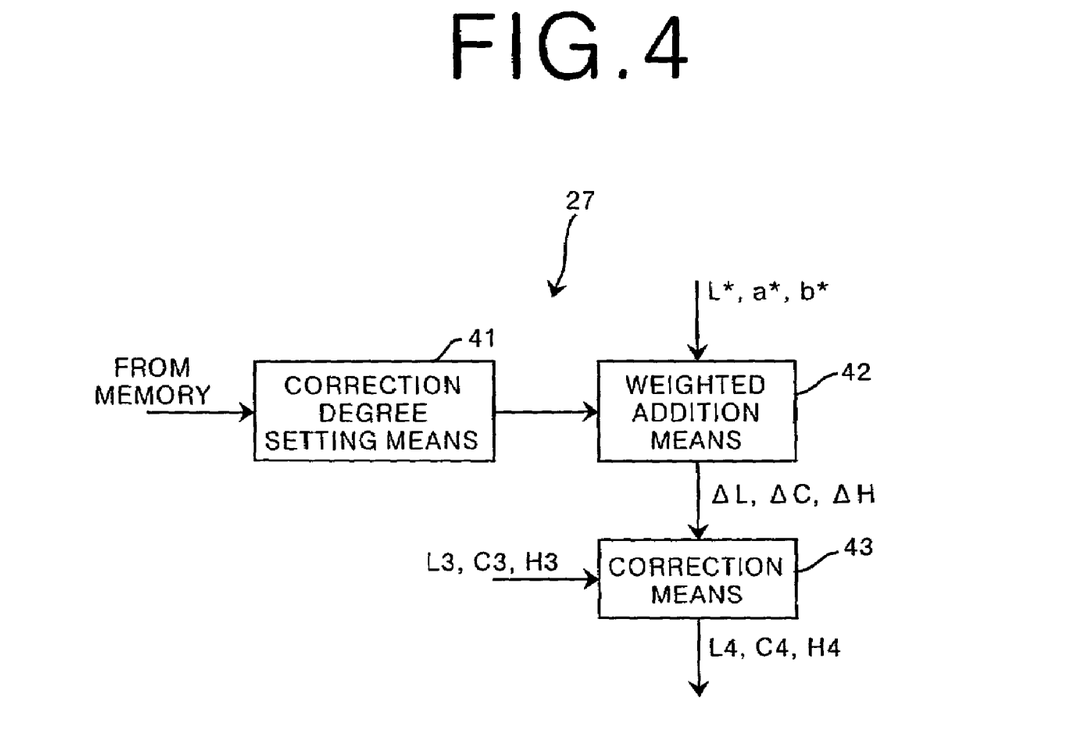
FIG. 4 is a block diagram showing a configuration of color correction means.

FIG. 4 is a block diagram showing a configuration of the color correction means 27. As shown in FIG. 4, the color correction means 27 comprises correction degree setting means 41, weighted addition means 42, and correction means 43.

Figure 5:
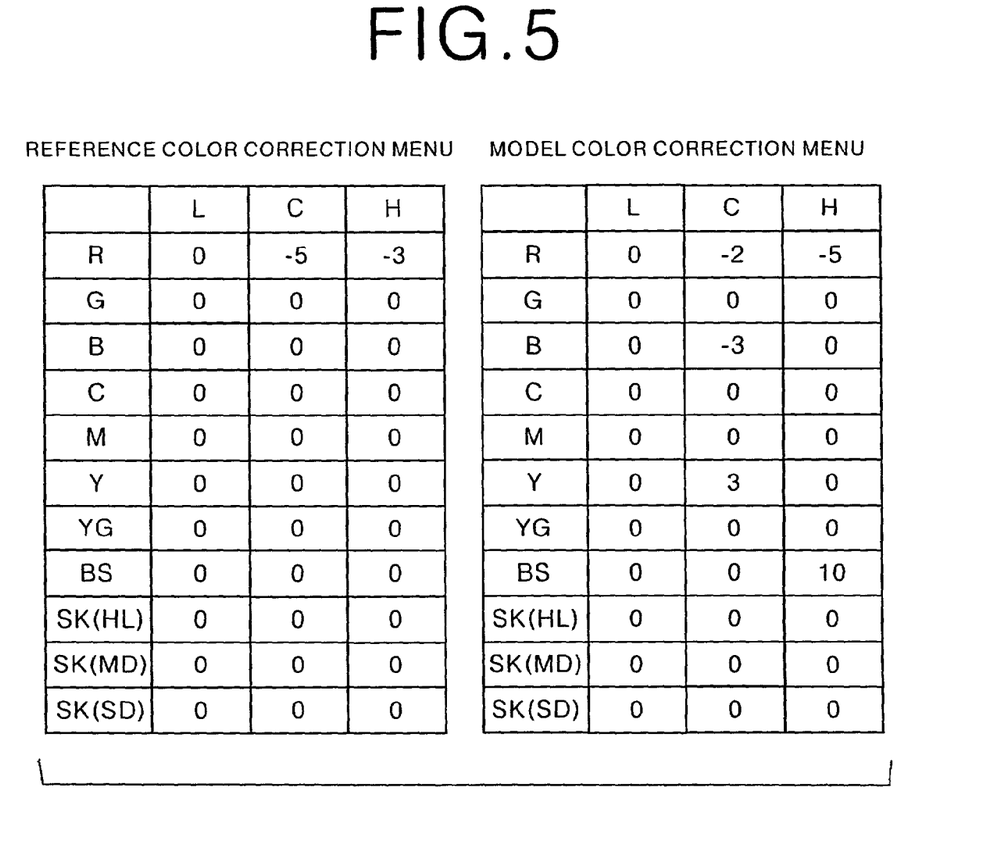
FIG. 5 shows tables of color correction menus.

The lightness correction degrees LPi and LPj, the chroma correction degrees CPi and CPj, and the hue correction degrees HPi and HPj are set by the correction degree setting means 41 according to a color correction menu stored in the memory 31. FIG. 5 shows the color correction menu. The memory 31 stores reference color correction menus for common color correction for the entire data L3, C3 and H3, and model color correction menus for color correction corresponding to digital camera models. When the setting information H0 is input to the color correction means 27, a model color correction menu corresponding to the model of the digital camera is read from the memory 31 based on the information on the model of the digital camera included in the setting information H0. Meanwhile, a reference color correction menu for the standard situation is read from the memory 31 as a default menu. In the case where reading a color correction menu for cloudy weather or for backlight or for flash photographing is specified by the input means 8, a color correction menu therefor is read from the memory 31. The color correction menu has a plurality of values representing how much the lightness, the chroma and the hue need to be changed. The correction degree setting means 41 of the color correction means 27 sets the lightness correction degrees LPi and LPj, the chroma correction degrees CPi and CPj, and the hue correction degrees HPi and HPj in Equations (9)~(11) according to the values set in the reference color correction menu and the model color correction menu. The correction degrees in each color are obtained by adding the corresponding values in the reference color correction menu and the model color correction menu.

The reference color correction menu and the model color correction menu can be customized by changing the menus as desired with the input means 8. The customized reference color correction menu and the customized model color correction menu may be stored in the memory 31 by being classified according to users, such as "cloudy-weather reference color correction menu for user A" and "cloudy-weather model color correction menu for digital camera A of user A".

The intensity functions are found according to Equation (12) below:

$$Wi = F(d)$$

where $$d = ((Li-L)^2 + (ai-a)^2 + (bi-b)^2))^{1/2} \quad (12)$$

Figure 6:
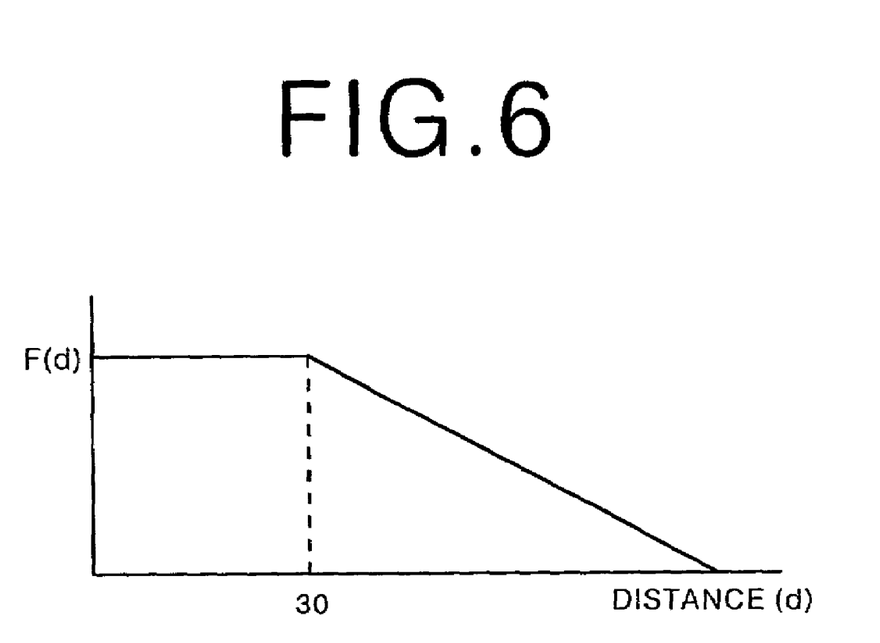
FIG. 6 is a diagram showing an example of an intensity function.

Li, ai, and bi refer to center colors of R, G, B, C, M, Y, YG, and BS in the L*a*b* color space. For R, G, B, C, M, and Y, the center colors refer to calorimetric values of the colors of the Macbeth Color Checker registered by Macbeth A Division of Kallmorgen Co. For YG and BS, the center colors refer to average calorimetric values of vegetation and sky in the image represented by the image data S0. d is a distance in the L*a*b* color space between the center color Li, ai, and bi of each of the colors and the values of L*, a*, and b* obtained by the LCH conversion means 26. F(d) is a function such that F(d) is constant up to a predetermined value of d (30 in this example) and decreases if d becomes larger than the predetermined value, as shown in FIG. 6.

Figure 7:
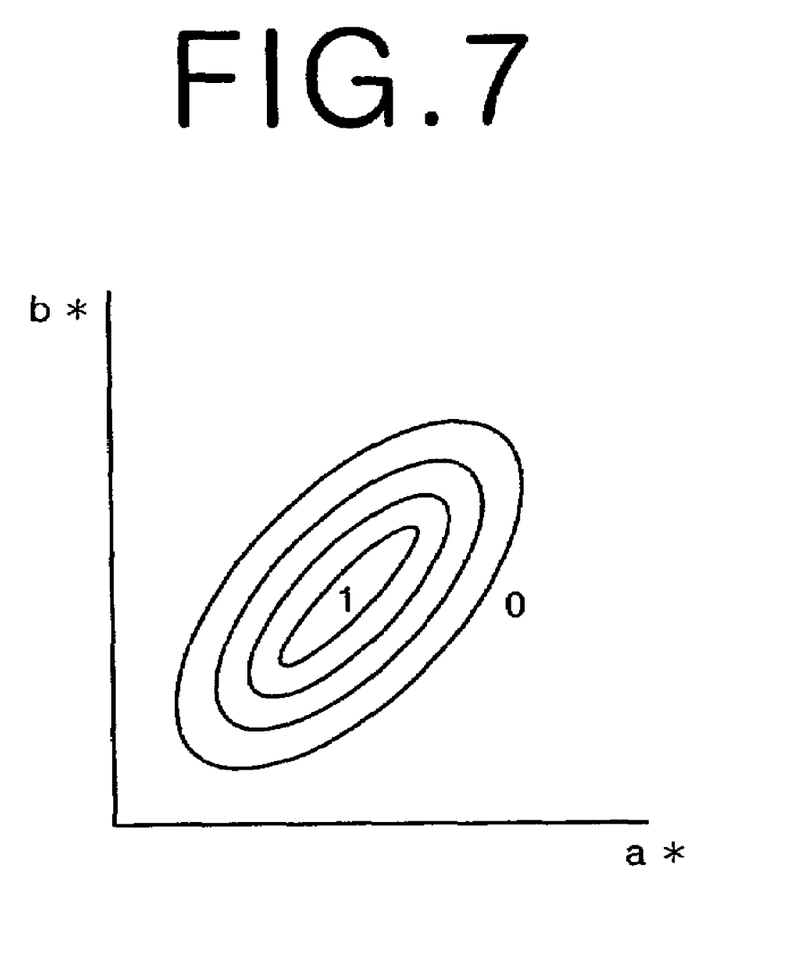
FIG. 7 is a diagram showing an example of an intensity function for a skin color.

Meanwhile, the intensity function Wj is a function for skin color. Statistical distribution ranges of the skin colors SK(HL), SK (MD) and SK(SD) of the image represented by the image data S0 in the L*a*b* color space are found, and the skin color function W(j) [0≦Wj≦1] is set in such a manner that the value of the function is small in a peripheral area and large at a center area in the distributions, as shown in FIG. 7.

The weighted addition means 42 finds the correction values ΔL, ΔC, and ΔH of the lightness, the chroma and the hue in Equations (9) to (11) by using the distance d and the intensity functions Wi and Wj. The correction means 43 obtains the corrected data L4, C4 and H4 by carrying out the operation of Equations (9) to (11).

Figure 8:
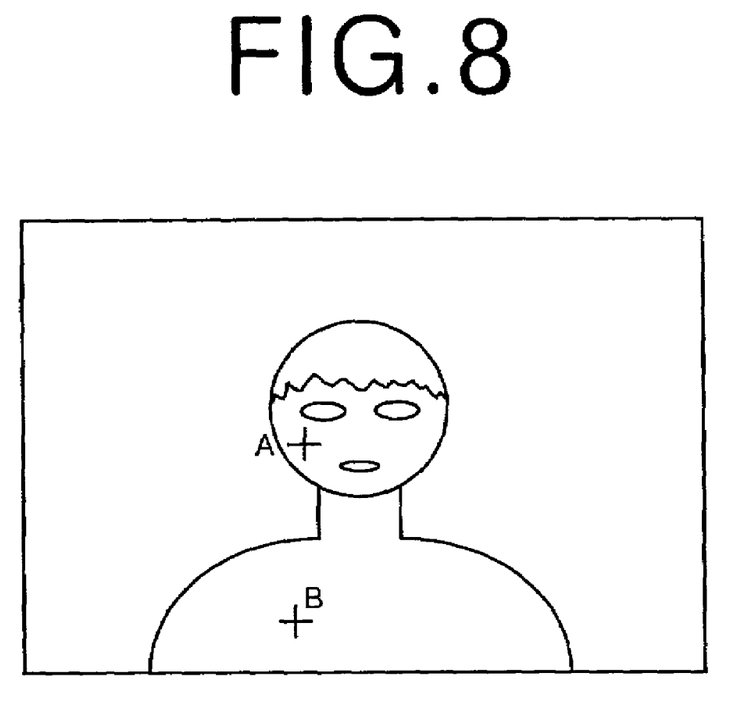
FIG. 8 shows an index image displayed on a monitor.
Figure 9:
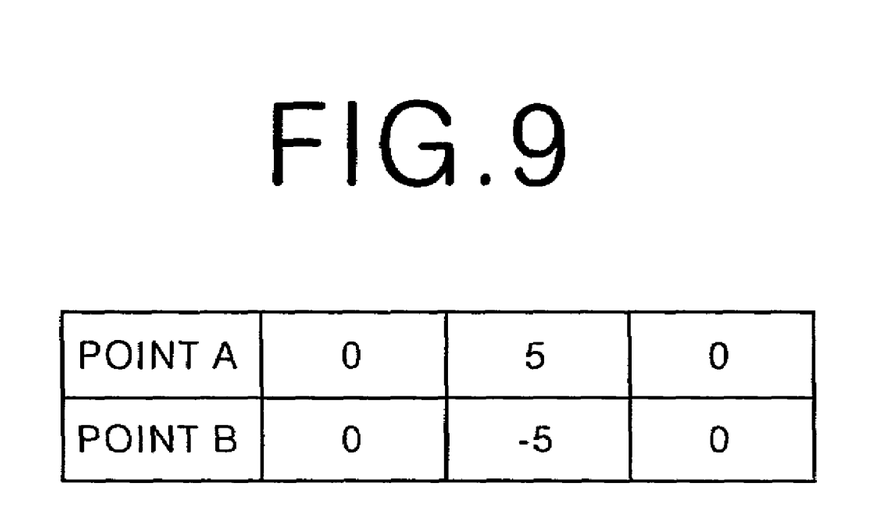
FIG. 9 shows an additional color correction menu.

As shown in FIG. 8, in any one of the index images shown on the monitor 7, any color other than R, G, B, C, M, Y, YG, BS, SK(HL), SK(MD), and SK(SD) may be specified so that a correction degree for the color as the center color can be reflected in Equations (9) to (11). In this case, if points A and B in FIG. 8 are specified, colors in 5×5 pixel ranges whose centers are positioned at A and B are found, and a color correction menu for the colors is set as shown in FIG. 9. From Equations (9)~(11), the corrected data L4, C4, and H4 are then found.

Δl, Δc, and Δh represent how much the lightness, the chroma, and the hue of the skin color are changed according to the nonlinear tone conversion set in the fourth quadrant in FIG. 4 by the tone setting means 23, and are found in the following manner. Based on the color data R1, G1, and B1 of the image data before the tone conversion and based on the color data R2, G2, B2 after the tone conversion, changes ΔL*, ΔC*, and ΔHA of the lightness L*, the chroma C*, and the hue angle HA are found for each pixel by carrying out the processing according to Equations (4)~(8) and the processing by the inverse logarithmic conversion means 25. The changes ΔL*, ΔC*, and ΔHA are multiplied by the intensity function Wj shown in FIG. 6 as in Equations (13)~(15) below, and Δl, Δc, and Δh are found:

$$\Delta l = \Delta L^* \times Wj \quad (13)$$

$$\Delta c = \Delta C^* \times Wj \quad (14)$$

$$\Delta h = \Delta HA \times Wj \quad (15)$$

The sRGB conversion means 28 finds a* and b* after the correction by solving Equations (7) and (8) by using the corrected data L4, C4 and H4. The sRGB conversion means 28 then finds tristimulus values X5, Y5, and Z5 after the correction by solving Equation (6) using a* and b* after the correction and using L*. The tristimulus values X5, Y5, and Z5 are then converted into color data R4', G4' and B4' according to Equation (16) below:

$$\begin{pmatrix} R4' \\ G4' \\ B4' \end{pmatrix} = |A|^{-1} \begin{pmatrix} X5 \\ Y5 \\ Z5 \end{pmatrix} \quad (16)$$

The color data R4, G4, and B4 are then found by using the following Equation (17), and the data are used as the color corrected image data S4 in the sRGB color space for monitor display:

$$R4 = 255 \times (1.055 R4'^{1.0/2.4} - 0.055) \quad (17)$$
$$G4 = 255 \times (1.055 G4'^{1.0/2.4} - 0.055)$$
$$B4 = 255 \times (1.055 B4'^{1.0/2.4} - 0.055) \text{ (if } 0.00304 \leq R4', G4', B4' \leq 1)$$
$$R4 = 255 \times 12.92 R4'$$
$$G4 = 255 \times 12.92 G4' \text{ (if } 0 \leq R4', G4', B4' < 0.00304)$$
$$B4 = 255 \times 12.92 B4'$$

The processing method determining means 33 calculates the number of lattice points of the 3DLUT for the tone conversion and the color correction of the image data S0, by using the number of bits of the image data S0. The calculated number of lattice points of the 3DLUT is compared with the number Y0 of the pixels of the image represented by the image data S0. If the number of the lattice points is larger than the number of the pixels, the 3DLUT is not generated and the image processing conditions comprising the tone conversion tables T0 and the color correction conditions (ΔL, ΔC, and ΔH in Equations (9) to (11)) are output to the processing means 10 (the procedure shown by a dashed line). On the other hand, if the number of lattice points is equal to or smaller than the number of the pixels, the procedure returns to the processing to generate the 3DLUT (the processing by the printer conversion means 29 and the LUT generating means 30).

The printer conversion means 29 obtains the print image data S5 by converting the color corrected image data S4 according to a 3DLUT (three-dimensional look-up table) for converting the color corrected image data S4 in the sRGB color space into a color space for printing.

The LUT generating means 30 finds a relationship between the color data R0, G0, and B0 comprising the image data S0 and the color data R5, G5, and B5 comprising the print image data S5 for each of the RGB colors, and uses the relationship as the 3DLUT having 33 data to be output to the processing means 10.

The index image data S11 are input to the image processing condition determining means 6, and the tone conversion processing is carried out thereon. For the index image data S11, the number of bits is not reduced and only the tone conversion processing using the tone conversion tables T0 is carried out by the tone conversion means 22. The color correction processing by the color correction means 27 is not carried out thereon, and the index image data are converted into the sRGB color space to be output as the index image data S11' after the tone conversion processing. At this time, since the index image data S11 are not used for generating the 3DLUT, the tone conversion means 22 sequentially carries out the tone conversion on the index image data S11 according to the tone conversion tables T0 sequentially set by the tone setting means 23 while reflecting the pressing of the DCMY keys 9 or the density changes caused by the correction in the tone curves, and outputs the index image data S11'. In this manner, the index images whose tones have been corrected can be displayed in real time on the monitor 7.

The color correction processing may also be carried out on the index image data S11 in addition to the tone conversion processing. In this manner, the index images whose tones have been converted and whose colors have been corrected can be displayed on the monitor 7 in real time.

The 3DLUT or the image processing conditions generated or determined by the image processing condition determining means 6 in FIG. 1 are input to the processing means 10. If the 3DLUT is input to the processing means 10, the image data S0 are converted according to the 3DLUT, and the converted image data S12 are obtained. At this time, since the 3DLUT comprises the $33^3$ data, the color data comprising the converted image data S12 are found by volume interpolation or area interpolation of the 3DLUT, as has been described in Japanese Unexamined Patent Publication No. 2(1990)-87192, for example.

Meanwhile, if the image processing conditions comprising the tone conversion tables T0 and the color correction conditions are input to the processing means 10, the tone conversion and the color correction are carried out on each of the pixels in the image data S0 by using the image processing conditions, and the image data S0 are converted into the converted image data S12 for printing.

The number of pixels of the digital camera that obtained the image data S0 varies, and may be smaller or larger than the number of pixels necessary for printing. Therefore, if the number of the pixels in the image data S0 is larger than the pixels necessary for printing, the reduction means 11 reduces the image data S0 before the processing by the processing means 10 and obtains the reduced image data S0'. The reduced image data S0' are converted into the converted image data S12. On the other hand, if the number of pixels is smaller than needed, the converted image data S12 obtained by the processing means 10 are enlarged by the enlargement means 12, and the enlarged image data S12' are obtained.

The sharpness processing means 13 carries out sharpness processing on the converted image data S12, or on the enlarged image data S12' according to Equation (18) below, and obtains the processed image data S13. In Equation (18), the sharpness processing is carried out on the converted image data S12.

$$S13 = S12 + \beta(S12 - S12us) \quad (18)$$

where S12us is unsharp image data of the converted image data S12, and $\beta$ is an enhancement factor.

The enhancement factor $\beta$ may be changed according to a reduction ratio used by the reduction means 11 or an enlargement ratio used by the enlargement means 12.

Figure 10:
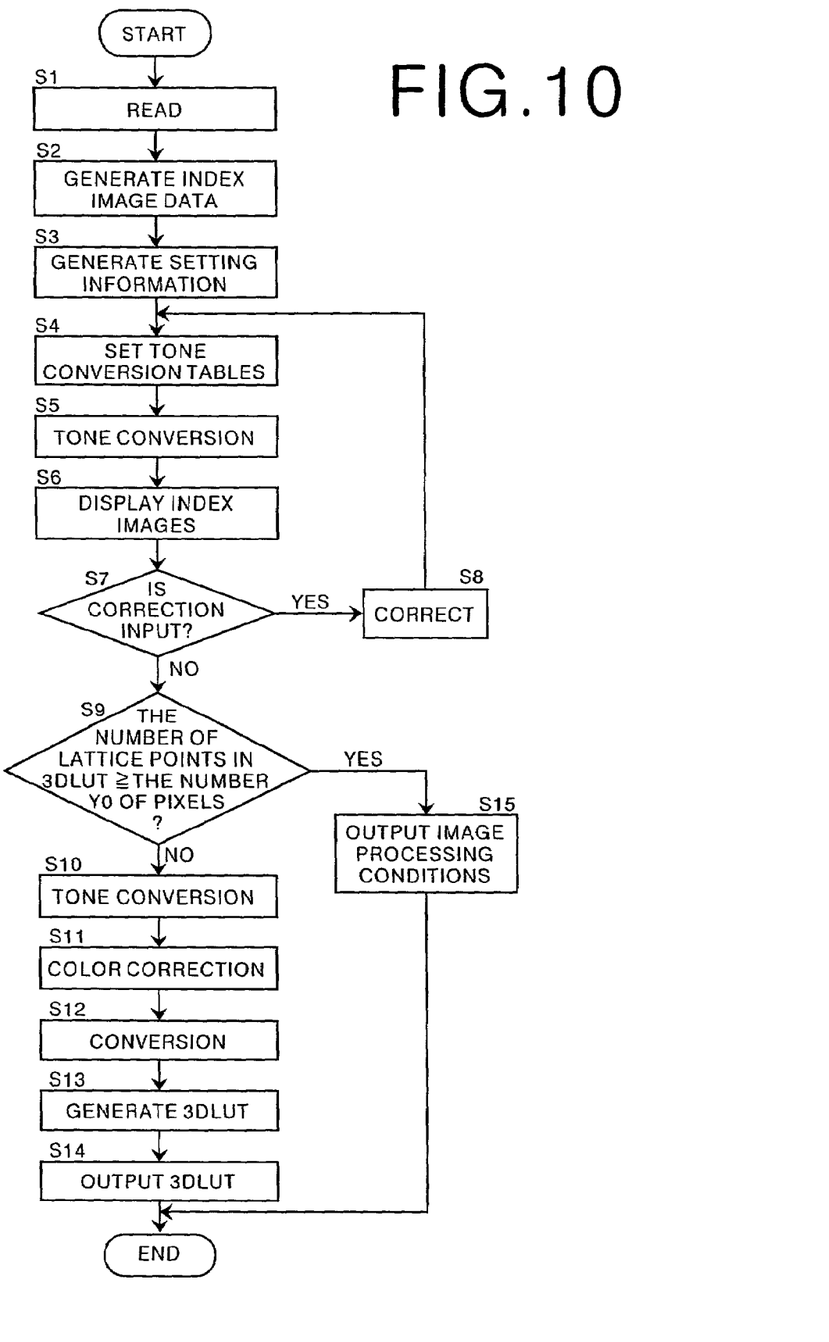
FIG. 10 is a flow chart showing operation of this embodiment.

Operation of this embodiment will be explained next. FIG. 10 is a flow chart showing the operation of this embodiment. The image data S0 obtained by photographing with the digital camera are read from the memory card 2 by the reading means 3 (Step S1). The index image generating means 4 generates the index image data S11 representing the index images of the image data S0 (Step S2), and inputs the index image data S11 to the image processing condition determining means 6. Meanwhile, the setting information generating means 5 generates the setting information H0 (Step S3), and inputs the setting information H0 to the image processing condition determining means 6.

The tone setting means 23 of the image processing condition determining means 6 sets the tone conversion tables T0 for converting the image data S0 according to the setting information H0 (Step S4), and the tone conversion means 22 carries out the tone conversion on the index image data S11 based on the tone conversion tables T0 (Step S5). The index images without color correction are then displayed on the monitor 7 (Step S6). An operator views the index images, and, if necessary (Step S7: YES), carries out the input by using the input means 8 or the DCMY keys 9 (Step S7) The tones and/or the densities of the index images are then corrected (Step S8) The procedure returns to Step S4 and the processing from Step S4 to Step S6, in which the tone conversion tables T0 are newly set for the corrected tones and/or the densities and the index image data S11 are subjected to the tone conversion according to the newly set tone conversion tables T0 to be displayed on the monitor 7, is repeated.

If no correction is carried out, or when the correction is completed, a result at Step S7 becomes negative. The number of the lattice points of the 3DLUT calculated based on the number of bits of the image data S0 is compared with the number Y0 of the pixels in the image represented by the image data S0 (Step S9). If the number of the lattice points of the 3DLUT is larger than the number of the pixels (Step S9: YES), the image processing conditions (the tone conversion tables T0 and the color correction conditions) are input to the processing means 10 (Step S15). If the number of the lattice points is equal to or smaller than the number of the pixels (Step S9: NO), the tone conversion is carried out on the image data S0 according to the tone conversion tables T0 set finally (Step S10), and the color correction is then carried out (Step S11). The conversion to the sRGB color space and the conversion to the color space for printing are also carried out (Step S12) and the print image data S5 are obtained. The LUT generating means 30 generates the 3DLUT (Step S13) by finding the relationship between the image data S0 and the print image data S5 for each of the RGB colors. The 3DLUT is input to the processing means 10 (Step S14).

As has been described above, the processing means 10 obtains the converted image data S12 by converting the image data S0 according to the 3DLUT, if the 3DLUT is input thereto. However, if the image processing conditions comprising the tone conversion tables T0 and the color correction conditions are input, the processing means 10 obtains the converted image data S12 by carrying out the tone conversion and the color correction on each of the pixels of the image data S0 according to the image processing conditions.

The converted image data S12 are then subjected to the sharpness processing by the sharpness processing means 13, and output as the print P from the printer 14.

The image data S0 read from the memory card 2 are subjected to the reduction processing by the reduction means 11 if necessary, and the reduced image data S0' are obtained. In this case, the reduced image data S0' are used as the image data S0 described above, and the same processing as has been described above is carried out thereon. Meanwhile, if enlargement is necessary, the converted image data S12 obtained from the image data S0 are enlarged by the enlargement means 12, and the enlarged image data S12' are obtained. The same processing is then carried out on the enlarged image data S12' as has been described above.

As has been described above, in this embodiment, the correction degrees of the lightness, the chroma and the hue are set for the predetermined colors R, G, B, C, M, Y, YG, BS, SK(HL), SK (MD), and SK(SD), and the distance d between the center color of each of the predetermined colors and the data L3, C3, H3 in the L*a*b* color space is found. Based on the distance d, the correction degrees of the lightness, the chroma and the hue are subjected to weighted addition for each of the colors, and the correction values ΔL, ΔC, and ΔH are found. By using the correction values ΔL, ΔC, and ΔH, the predetermined colors R, G, B, C, M, Y, YG, BS, SK(HL) SK(MD) and SK(SD) are corrected. Therefore, the lightness, the chroma and the hue of the specific colors in the image represented by the image data S0 can be corrected appropriately, and the processed image data S13 enabling reproduction the image in high quality can be obtained.

Since the colors to be corrected include the skin color SK, the skin color can be corrected appropriately and an image including a person can be made high quality.

In the above embodiment, the skin color is classified depending on the lightness, such as the skin color in the highlight portion SK(HL), the skin color having the intermediate density SK(MD), and the skin color in the shadow portion SK(SD), so that the skin color of each type is corrected. However, the skin color may be classified according to the chroma or the hue thereof, and the skin color having the chroma or the hue of each type may be corrected.

In some cases, the skin color having different lightness, chroma and/or hue may be included in one image, depending on a position or a type of a light source used at the time of photographing. In such a case, if the color correction is carried out on the skin color as a target of the correction, the skin color has uniform lightness, chroma and/or hue, and the image gives an unnatural impression. Therefore, by classifying the skin color in a plurality of types according to the lightness, the chroma and/or the hue thereof and by including the skin color in each type in the specific colors, the skin color can be corrected appropriately, depending on the lightness, the chroma and/or the hue thereof. In this manner, an image giving a natural impression can be obtained.

In the above embodiment, the color correction is carried out in the L*a*b* color space. However, the color correction can be carried out in any uniform color difference space, such as an L*u*v* color space.

In the above embodiment, the color correction apparatus of the present invention is used for generation of the 3DLUT. However, the color correction may be carried out on the image data in real time. Furthermore, the color correction apparatus of the present invention may be used in a stand-alone manner, although the color correction apparatus is applied to the image output apparatus in this embodiment.

In the above embodiment, the image output apparatus reads the image data S0 from the memory card 2. However, the present invention is applicable to a system in which image data are received from a transmitting apparatus via a network such as a LAN or WAN.

What is claimed is:

1. A color correction method for obtaining processed image data by carrying out color correction processing on an image, which is represented by image data obtained by a digital camera, the method comprising the steps of:

setting correction degrees for lightness, chroma and hue of predetermined specific colors before correcting lightness, chroma and hue of the image represented by the image data;

obtaining correction values for lightness, chroma and hue by weighted addition of the correction degrees of the lightness, the chroma and the hue of the specific colors, based on a distance in a uniform color difference space between a center color of each of the specific colors and a color in the image represented by the image data; and obtaining the processed image data by correcting lightness, chroma and hue of the image represented by the image data, based on the correction values of the lightness, the chroma and the hue.

2. A color correction method as defined in claim 1, wherein the specific colors include a skin color.

3. A color correction method as defined in claim 2, wherein the skin color is classified into a plurality of types according to lightness, chroma and/or hue thereof, and included in the specific color.

4. A color correction method as defined in any one of claims 1 to 3, further comprising the steps of:

displaying the image represented by the image data;

receiving specification of a desired position in the image displayed on the display means; and including a color at the specified position in the specific colors.

5. A color correction apparatus for obtaining processed image data by carrying out color correction processing on an image, which is represented by image data obtained by a digital camera, the color correction apparatus comprising:

correction degree setting means for setting correction degrees of lightness, chroma and hue of predetermined specific colors before correcting lightness, chroma and hue of the image represented by the image data;

weighted addition means for obtaining correction values for lightness, chroma and hue by carrying out weighted addition of the correction degrees of the lightness, the chroma and the hue of the specific colors, based on a distance in a uniform color difference space between a center color of each of the specific colors and a color in the image represented by the image data; and correction means for obtaining the processed image data by correcting lightness, chroma and hue of the image represented by the image data, based on the correction values of the lightness, the chroma and the hue.

6. A color correction apparatus as defined in claim 5, wherein the specific colors include a skin color.

7. A color correction apparatus as defined in claim 6, wherein the skin color is classified into a plurality of types according to lightness, chroma, and hue thereof, and included in the specific colors.

8. A color correction apparatus as defined in any one of claims 5 to 7, further comprising:

display means for displaying the image represented by the image data; and specification means for specifying a desired position in the image displayed on the display means, whereby a color at the specified position the image is included in the specific colors.

9. A computer-readable recording medium storing a program to cause a computer to execute a color correction method for obtaining processed image data by carrying out color correction processing on an image, which is represented by image data obtained by a digital camera, the program comprising the procedures of:

setting correction degrees for lightness, chroma and hue of predetermined specific colors before correcting lightness, chroma and hue of the image represented by the image data;

obtaining correction values for lightness, chroma and hue by weighted addition of the correction degrees of the lightness, the chroma and the hue of the specific colors, based on a distance in a uniform color difference space between a center color of each of the specific colors and a color comprising an image represented by the image data; and obtaining the processed image data by correcting lightness, chroma and hue of the image represented by the image data, based on the correction values of the lightness, the chroma and the hue.

10. A computer-readable recording medium as defined in claim 9, wherein the specific colors include a skin color.

11. A computer-readable recording medium as defined in claim 10, wherein the skin color is classified into a plurality of types according to lightness, chroma, and/or hue thereof, and included in the specific colors.

12. A computer-readable recording medium as defined in any one of claims 9 to 11, the program further comprising the procedures of:

displaying the image represented by the image data on display means; and receiving specification of a desired position in the image displayed on the display means, whereby a color at the specified position in the image is included in the specific colors.

* * * * *